(12) United States Patent
Bolle et al.

(10) Patent No.: US 6,941,001 B1
(45) Date of Patent: Sep. 6, 2005

(54) TO A COMBINED FINGERPRINT ACQUISITION AND CONTROL DEVICE

(75) Inventors: Rudolf M. Bolle, Bedford Hills, NY (US); Nalini K. Ratha, Yorktown Hts., NY (US); Andrew Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/489,908

(22) Filed: Jan. 24, 2000

Related U.S. Application Data (63) Continuation-in-part of application No. 09/080,322, filed on May 15, 1998, now Pat. No. 6,400,836.

(51) Int. Cl.[7] .............................................. G06K 9/00
(52) U.S. Cl. ..................................... 382/124; 382/115
(58) Field of Search ........................ 382/115–119, 124, 382/125, 126; 345/173–178; 713/182–186

(56) References Cited

U.S. PATENT DOCUMENTS 5,717,777 A * 2/1998 Wong et al. ................. 382/124
5,999,637 A * 12/1999 Toyoda et al. ............... 382/124
6,185,318 B1 * 2/2001 Jain et al. .................... 382/125
6,400,836 B2 * 6/2002 Senior ......................... 382/124

FOREIGN PATENT DOCUMENTS

JP          04158434 A   *  6/1992

OTHER PUBLICATIONS

Adaptive flow orientation based feature extraction in fingerprint images, by Ratha et al, Pattern Recognition, vol. 28 No. 11, 1657-1672, Nov. 1995.*
A real time matching system for large fingerprint databases, by Ratha et al, IEEE, Aug. 1996.*

* cited by examiner

Primary Examiner—Vikkram Bali
(74) Attorney, Agent, or Firm—Whitham, Curtis & Christofferson, P.C.; Louis J. Percello (57) ABSTRACT

The present invention combines the functionality of a computer pointing device with a fingerprint authentication system, In the preferred embodiment, by regularly scanning fingerprints acquired from the pointing device touch pad, fingerprint features may be extracted and compared to stored data on authorized users for passive authentication. Furthermore, calculations based upon the acquired fingerprint images and associated features allows the system to determine six degrees of freedom of the finger, allowing the user to control a variety of functions or to manipulate a three-dimensional model or virtual reality system.

23 Claims, 7 Drawing Sheets

|  |  |  |  |
|---|---|---|---|
| 130 | 130 | 130 | 130 |
| 130 | 130 | 130 | 130 |
| 130 | 130 | 130 | 130 |
| 130 | 130 | 130 | 130 |

| 130 |
|---|
| 130 |
| 130 |
| 130 |

TO A COMBINED FINGERPRINT ACQUISITION AND CONTROL DEVICE

CROSS REFERENCE TO RELATED APPLICATION

This application is a continuation-in-part of U.S. application Ser. No. 09/080,322 to Andrew Senior, filed on May 15, 1998, for "Combined Fingerprint Acquisition and Control Device" and assigned to a common assignee herewith, now U.S. Pat. No. 6,400,836. The disclosure of U.S. Pat. No. 6,400,836 is incorporated herein by reference.

BACKGROUND OF THE INVENTION

1. Field of the Invention

The present invention generally relates to the field of computer input devices and, more particularly, to pointing devices, fingerprint acquisition devices, and secure fingerprint acquisition.

2. Background Description

Most common computer operating systems presently incorporate windowing in presenting information to users. Common examples of such software, often referred to as graphical user interfaces (GUIs), include Microsoft Corporation's Windows series and Apple Corporation's Mac OS. In such computer systems, a spatial metaphor is used to present information.

Some kind of pointing device is almost indispensable for the use of such a computer interface. Beginning with the mouse, a wide variety of pointing devices have been introduced, including trackballs, touchpads, and a variety of mechanical pointers. An example of such a pointing device is described in U.S. Pat. No. 5,489,900 to Cali et al. for "Force Sensitive Transducer for Use in a Computer Keyboard."

Such pointing devices which are alternative to the mouse are especially desirable for use with mobile computers. The users of such mobile computers often do not have available the large, flat space necessary for operating the traditional mouse.

Hence, a flood of pointing devices has been introduced in recent years, adapted for use with mobile computers. Each such device has advantages and disadvantages, allowing for a range of alternatives which may be adapted to a variety of usage scenarios and personal preferences.

It would therefore be desirable to provide a fingerprint authentication device capable of allowing user pointing, which is compact enough for incorporation into a mobile computer or other portable electronic device. Such a device would allow for user authentication without separate, active intervention by the user.

U.S. Pat. No. 6,400,836 to Senior employs the steps of viewing the fingerprint as an elliptical region, using this view to find rotation in the plane of the scanner, and finding the principal axes of the region. However, it is has been found that when pressure is light, as when only the very tip of the finger is used, or when the finger is at the edge of the scanning area, the principal axis of the pixels does not correspond to the principal axis of the finger tip. As a result, the reliability of the scanning method disclosed in U.S. Pat. No. 6,400,836 could be improved.

Fingerprint matching is a well-established and reliable method of identifying individuals. As such, it provides a good method for authentication of the identity of a person for such purposes as enabling use of equipment, access to data, and the authorization of transactions. In recent years, powerful processors and new algorithms, coupled with a variety of new, "livescan" fingerprint scanning devices, have enabled the automatic verification of fingerprints on small computer platforms.

The incorporation of such authentication devices would be particularly useful for notebook, laptop and other mobile computers, as well as in other portable electronic devices such as cellular telephones, personal digital assistants, etc. Mobile computers are more likely than desktop computers to be present in unsecured areas where unauthorized individuals might attempt to use or access the computer. Because users of such mobile computers often have confidential or proprietary information stored in these computers, such users have a strong interest in maintaining the security of their computers. Similarly, mobile phones are carried in public and are easily stolen, presenting a considerable financial risk in unauthorized use.

Nevertheless, existing security systems for such computers and phones require intentional, active intervention by the user, such as entering passwords or using key locks. The inconvenience of such frequent activity, in conjunction with the user's fears of misplacing or forgetting the key or password, often result in users ignoring available security systems.

Biometrics systems that are not designed with the proper safeguards are vulnerable to a number of attacks which can bypass or invalidate the security derived from such a system. One such category of attack is the replay attach. In this situation, data captured at a previous verification session is recorded by an eavesdropper, and replayed to the system layer when claiming authorization. Such attacks can be prevented with this device in a number of ways.

SUMMARY OF THE INVENTION

It is therefore an object of the present invention to provide new and improved methods of calculating the parameters previously described, and of using the parameters calculated.

It is further an object to provide an improved method to calculate rotational information for a fingerprint.

In describing the inventive system, it must be kept in mind that the scanner is imaging the interface between the finger and the scanner. As has been described before, this image will vary depending on the position and rotation of the fingertip. It is simple to work out where the fingertip is in contact with the scanner, by looking at which area of the image displays a fingerprint, but it is more difficult to determine the rotation of the finger with respect to the scanner.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

When comparing two fingerprint images of the same finger acquired from an imaging device (or indeed different capture systems), the patterns in the fingerprints may be different for a number of reasons, including plane rotation: the rotation of the finger about an axis perpendicular to the plane of the scanner. Such a rotation would cause features in the images to rotate about the axis of rotation. Other processes will cause the features to move about in other ways such as translation.

Figure 1:
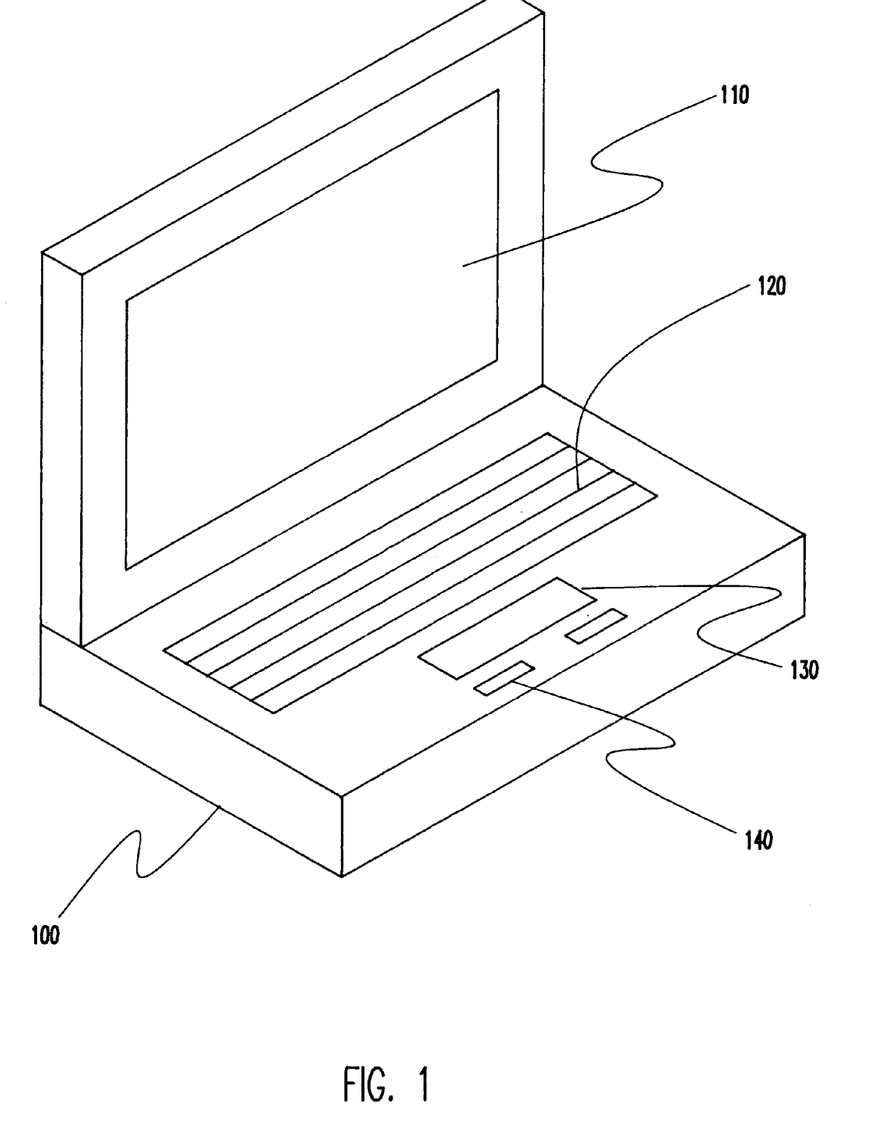
FIG. 1 is a perspective illustration of a mobile computer 100 incorporating a combined fingerprint image scanner and pointing device according to a the present invention.

In operation, the invention may be used as a security device for a mobile computer as shown in FIG. 1. In FIG. 1 there is shown a computer 100, having as screen 110 and keyboard 120. Computer 100 is shown having a combined fingerprint scanner and pointing device scanner 130 according to the present invention. A pair of optional control buttons 140 are also shown. Control buttons 140, may be used, for example, as substitutes for the buttons of a mouse. It should be noted that mobile computer 100 could be programmed to recognize some control signals such as a corresponding predetermined series of finger taps of short duration as representing the same functions as depressing each optional control button 140, whether or not optional control buttons 140 are present.

The preferred embodiment of the invention uses a compact, thin, flat scanner 130. The presently preferred choice of such a scanner 130 is that of a semiconductor fingerprint sensor, such as that described by Taikoe in U.S. Pat. No. 4,353,056. While such a semiconductor scanner 130 is presently preferred for use in conjunction with mobile computers, a wide variety of choices of mechanisms for fingerprint acquisition by scanner 130 may be used in accordance with the present invention. Optical scanning may be used either by frustrated total internal reflection, holographic elements or by conventional reflected light imaging. Similarly, a variety of electrical or electromagnetic scanners, semiconductor or otherwise, may be used, which utilize either capacitive or inductive scanning. Ultrasound imaging of the fingerprint might also be used. The present invention is compatible with any choice of fingerprint scanners which permit digital acquisition or interpretation of the fingerprint image.

The preferred embodiment of the present invention would require a scanner 130 several times larger than that of currently available semiconductor fingerprint scanners, to allow enough motion of the finger to allow unrestricted control pointing functions. Such currently available semiconductor fingerprint scanners are sized solely for static presentation of fingerprints for authentication scanning purposes.

Figure 2:
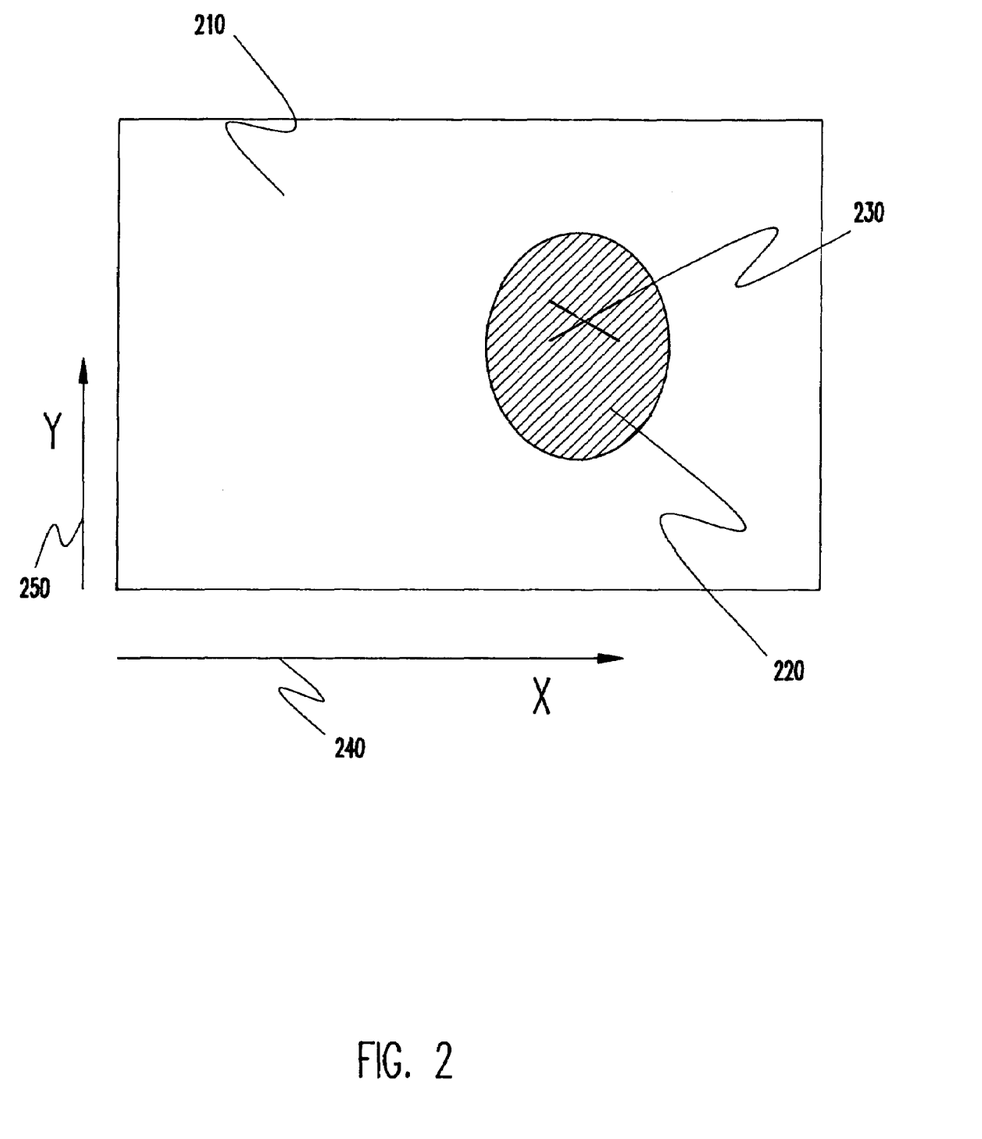
FIG. 2 is an illustration of the usable fingerprint scanner surface 210 of scanner 130 of FIG. 1.
Figure 2A:
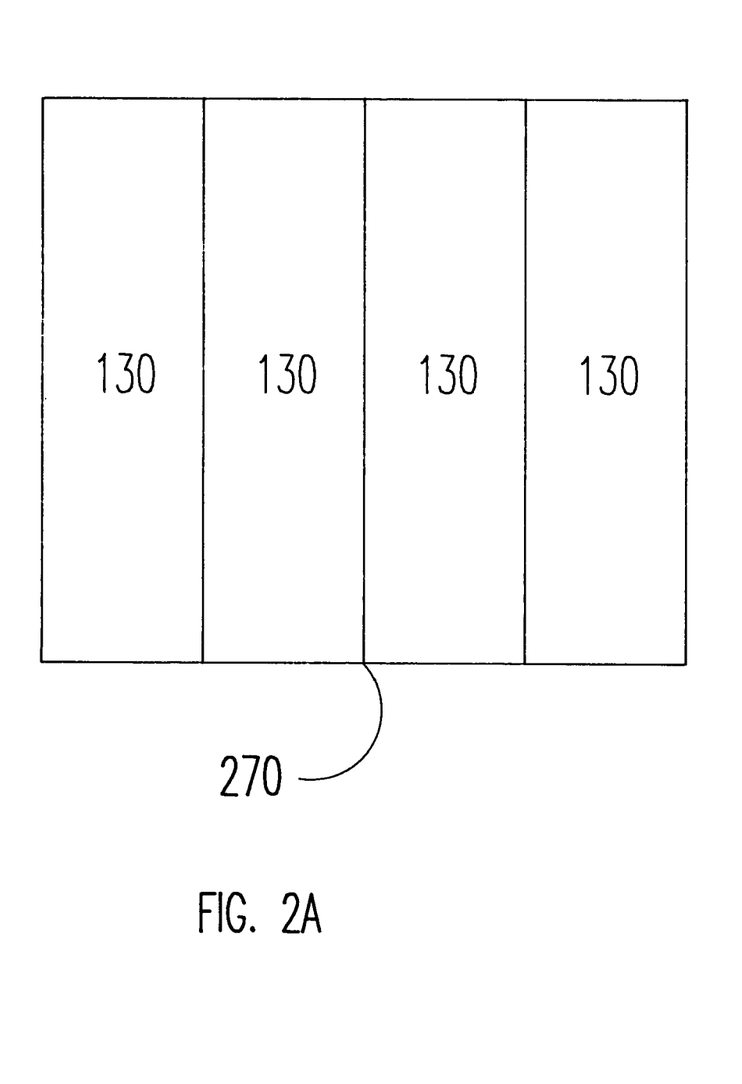
FIG. 2A is an illustration of a "tiled" fingerprint scanner using a row of small fingerprint scanners.
Figure 2B:
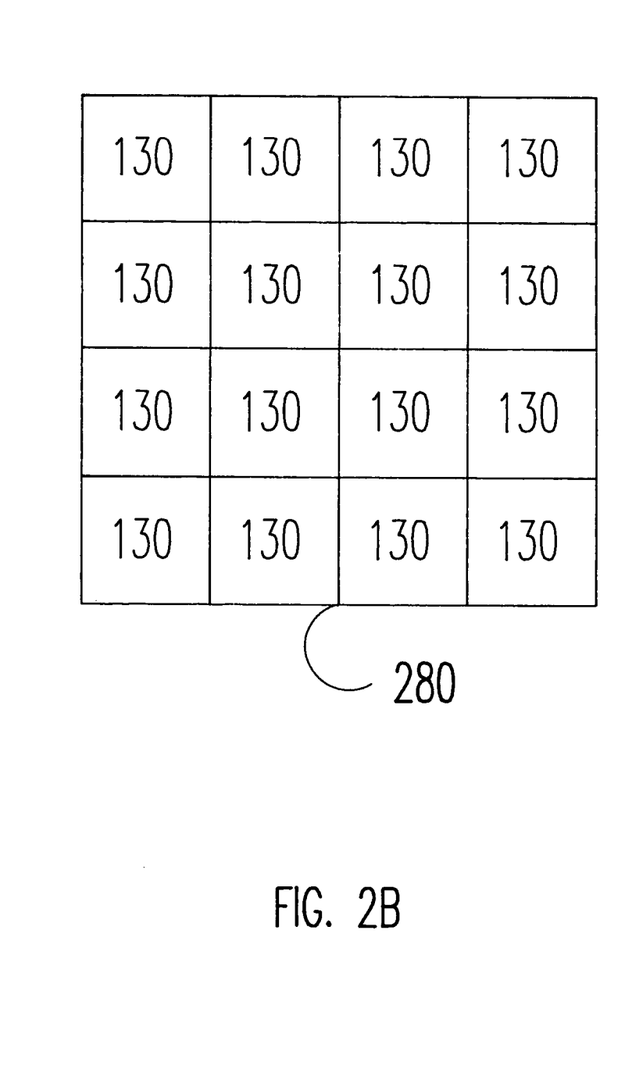
FIG. 2B is an illustration of a "tiled" fingerprint scanner using a set of smaller fingerprint scanners, in a two-dimensional array.

The semiconductor scanners being smaller in size (less than half the size of a normal average finger), a large scan area can be achieved by tiling a set of small fingerprint scanners to form a large scanning area 130 as shown in FIGS. 2A and 2B. The small scanners can be tiled in either a one-dimensional array 270, as shown in FIG. 2A, or as a two-dimensional array 280 as shown in FIG. 2B.

The need for such a large scanner 130 is best understood relative to FIG. 2. FIG. 2 shows a diagram of a fingerprint scanner surface 210 with an acquired fingerprint image 220. Fingerprint scanner surface 210 corresponds to the functional area of scanner 130. The portion of the surface area of scanner 130 which comprises scanner surface 210 depends upon the function characteristics of scanner 130, which may vary dependent upon the image acquisition method employed by scanner 130.

The presently preferred embodiment of the present invention calculates a center-of-area or centroid 230 of fingerprint image 220. Centroid 230 has an associated two dimensional coordinate relative to fingerprint scanner surface 210, which in FIG. 2 is represented as an x-coordinate 240 and a y-coordinate 250. The choice of coordinate systems is arbitrary, and may be chosen to facilitate computations related to the specific or general application of the device according to the present invention. This calculation is performed with each fingerprint image collected.

Having calculated a coordinate pair representative of fingerprint image 220, this coordinate pair allows scanner 130 to be used as a two-dimensional pointing device, in a manner well known in the prior art. For example, the coordinate of the scanner may be remapped to screen coordinates, so that the absolute finger position on scanner 130 relative to scanner surface 210 corresponds to an absolute screen position, just as with an electronic pen tablet. With such a remapping implementation, it is preferable to allow a margin of about half of a finger's width, mapping the area within such a margin to the screen area, to allow the user to easily point to any position on the screen with the centroid 230 of fingerprint image 220.

Alternatively, any movement of the finger in contact with scanner 130 would continuously change successive coordinates of centroid 230, allowing calculation of relative motion of acquired fingerprint images 220. This relative motion may be remapped to the motion of the cursor on the screen, in a manner similar to that of a joystick.

To determine the relative rotation of the finger between the two images, it is sufficient to find the rotation of the features between the images. This can be done by some feature extraction and alignment process, but a simple method of doing this is by finding image correlations. In the preferred embodiment of this method, small regions of one image are considered, and the most similar region in the other image is searched for. The motion of the first region to the second region is ambiguous, because of errors in the measurement process, but by considering a large number of regions with sufficient detail to limit the number of matching areas, a consensus will be reached, and the parameter of this motion can be considered to correspond to the motion of the finger.

In practice, a number of simplifying assumptions can be made to make this process efficient. In particular, if the images are gathered sequentially from a scanner with a high frame rate, the motions of the regions will be small. Thus, if a rectangular region of pixels is considered in one image, parallel to the axis, only nearby rectangular regions need to be searched. Further, since the rotation is small, the rectangular region will be translated to a rectangular region which is close enough to the axes to appear very similar to a similar axis-parallel rectangle. Thus, the search need only be conducted over nearby axis-parallel rectangles of the same size as the original region. The search is conducted to find the most similar such rectangle in the search region, using a similarity metric such as normalized correlation coefficient. The most similar region being found, its displacement with respect to the region in the original image can be calculated. Note that in this situation, it is unclear whether this displacement arose from pure translation, or from translation and rotation combined. However, the set of pairs of values of {translation, rotation} consistent with this observed displacement can be found.

By considering many such displacements, a consensus on the true translation and rotation can be found. One mechanism for doing this is to use the Hough transform, where the space of translations x rotations is divided into bins. Each displacement causes votes for all the bins with which it is consistent, and after all regions have voted, the bin with the highest number of votes is deemed to represent the true rotation and translation.

Figure 3:
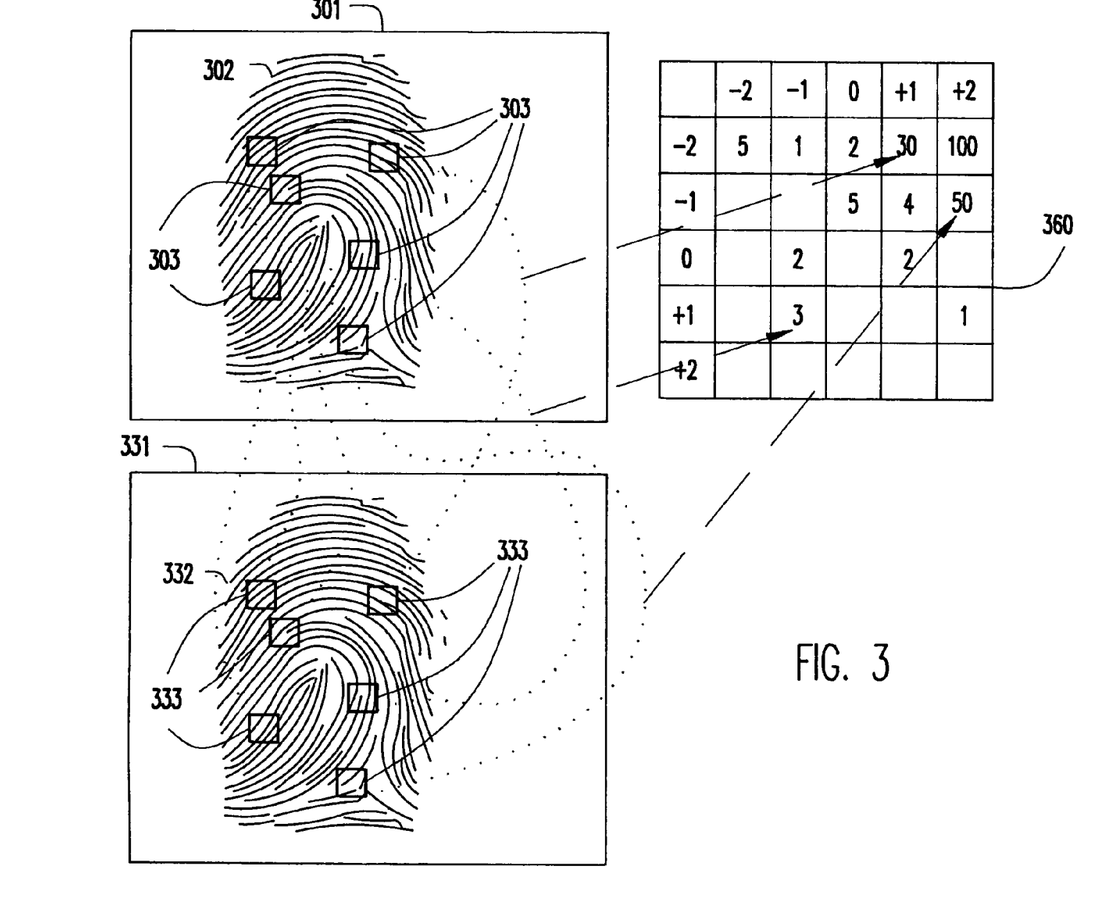
FIG. 3 shows an example of comparison of two consecutive fingerprint images according to this invention.

Optionally, a Hough transform based alignment of two fingerprint minutia templates can be used as presented in the following reference and is incorporated in its entirety. In this case the regions of interest in a fingerprint image 303 are chosen by a fingerprint feature extraction algorithm. See, for example, N. K. Ratha, K. Karu, S. Chen, and A. Jain, "A Real-Time Matching System for Large Fingerprint Databases", *IEEE Transactions on Pattern Analysis and Machine Intelligence*, Vol. 18, No. 8. August 1996, pp. 799–813.

An example of finding the translation parameters for the movement between two consecutive images acquired from a fingerprint scanner is shown L in FIG. 3. The diagram shows image 301 acquired from a fingerprint scanner, showing the image, 302 of a fingerprint. At some subsequent time, a new image 331 is acquired from the scanner with a new image of the fingerprint 332 which may have moved relative to its position in the previous image 302. One method for determining this displacement is to observe the motions of segments of the image. In a preferred embodiment, sections 303 of the fingerprint image are chosen (possibly at random or by some algorithm). The corresponding areas 333 of the fingerprint 331 are sought. This search is carried out by one of a number of inexact pattern matching algorithms, such as the method of correlation. In the correlation method, for some given area in the original fingerprint, it is compared with image areas around that location in the new image, the displacement resulting in the highest correlation coefficient is considered to be the new location of the selected area. The displacement of the matching region is noted, and entered as a vote in a translation table 360. After comparing many such areas of the original image, many "votes" have been entered in the table, as shown, and by picking the displacement with the largest number of votes, the aggregate translation of the fingerprint can be estimated.

If the rotation and translation are to be estimated, the voting table will have three dimensions (x, y, theta) and any given translation calculated for an image area, will correspond to many triplets of values in the table. A vote is entered in each box in the voting table consistent with the translation measured. At the end, the box with the highest number of votes is chosen, and the translation, rotation parameters are read off.

In practice these translation parameters represent translation due to the finger being translated across the surface, and the translation measured by a method such as the centroid method described previously will include components due to this translation but also due to the pitch and roll rotations of the finger. A variety of methods of combining these control parameters can be used to extract final control parameters suitable for controlling the computer, decoupled in a way intuitive for a given application or user. One of the aspects of this invention is to link pointing and authentication devices through fingerprints. Several preboot authentication methods using passwords are incorporated in the systems today using BIOS passwords.

Figure 4:
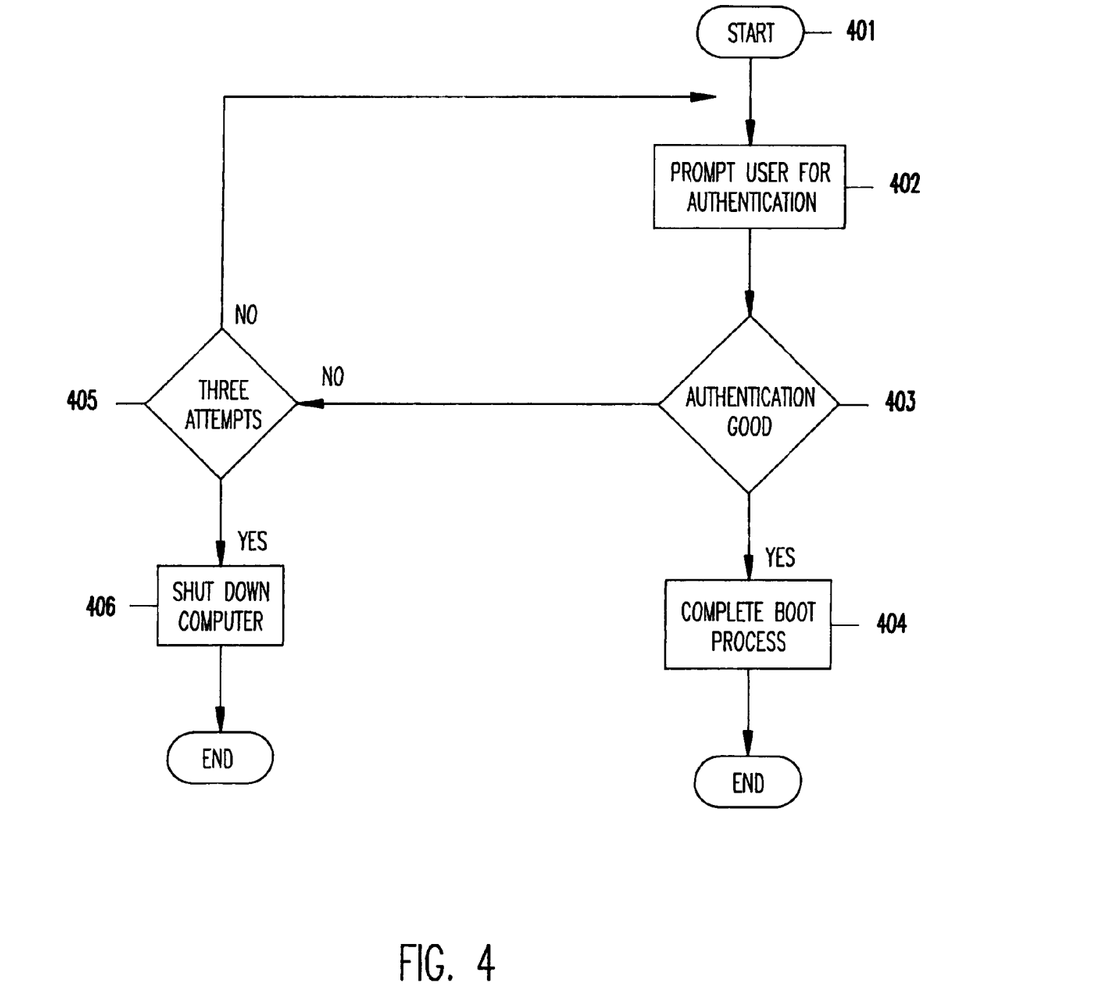
FIG. 4 is a flow diagram of the authentication process in general.

The authentication process is broadly shown in the flow chart in FIG. 4. At the start 401, the user is prompted 402 for authentication. If authentication is positive 403, the boot process is completed 404. However, if the authentication is negative, then the system cycles through the prompting steps 401 again until it is verified that three attempts 405 have been made to achieve authentication. After three attempts the computer is shut down 406.

Using fingerprints for authentication poses new problems. Fingerprint authentication systems are vulnerable to new types of attacks which can bypass the security described in FIG. 4. One example of this is the replay attack using stored fingerprints. In this case, a stored fingerprint image is replayed to the authentication system. The invention described herein can be used to circumvent such attacks in a number of ways. First, consider the case when a still image has been eavesdropped or captured from some other source, such as the lifting of a latent print. When replayed this image will be seen by this invention to be static, with the derived pose parameters unchanging and can be rejected as a replay attack.

Now, suppose that a video sequence of a fingerprint has been recorded. The computer system can prompt the user to move his or her finger in a particular manner (e.g. "Move left", "press harder", "rotate counterclockwise", etc.). Such prompts can be verified by observing the derived parameters when a live user presents a finger to be scanned and makes the requested gesture. But for a simple replay attack, the image sequence is predetermined and cannot respond to prompts, and so exposed as a replay attack. In the case of several small fingerprint scanners as in FIG. 2A or 2B, there are many other ways of achieving this step. For example, the user can touch the different tiles in a particular sequence and remember it as the password. This sequence of touches can be done using either a single finger or multiple fingers with the finger used for each touch also being part of the "password".

Figure 5:
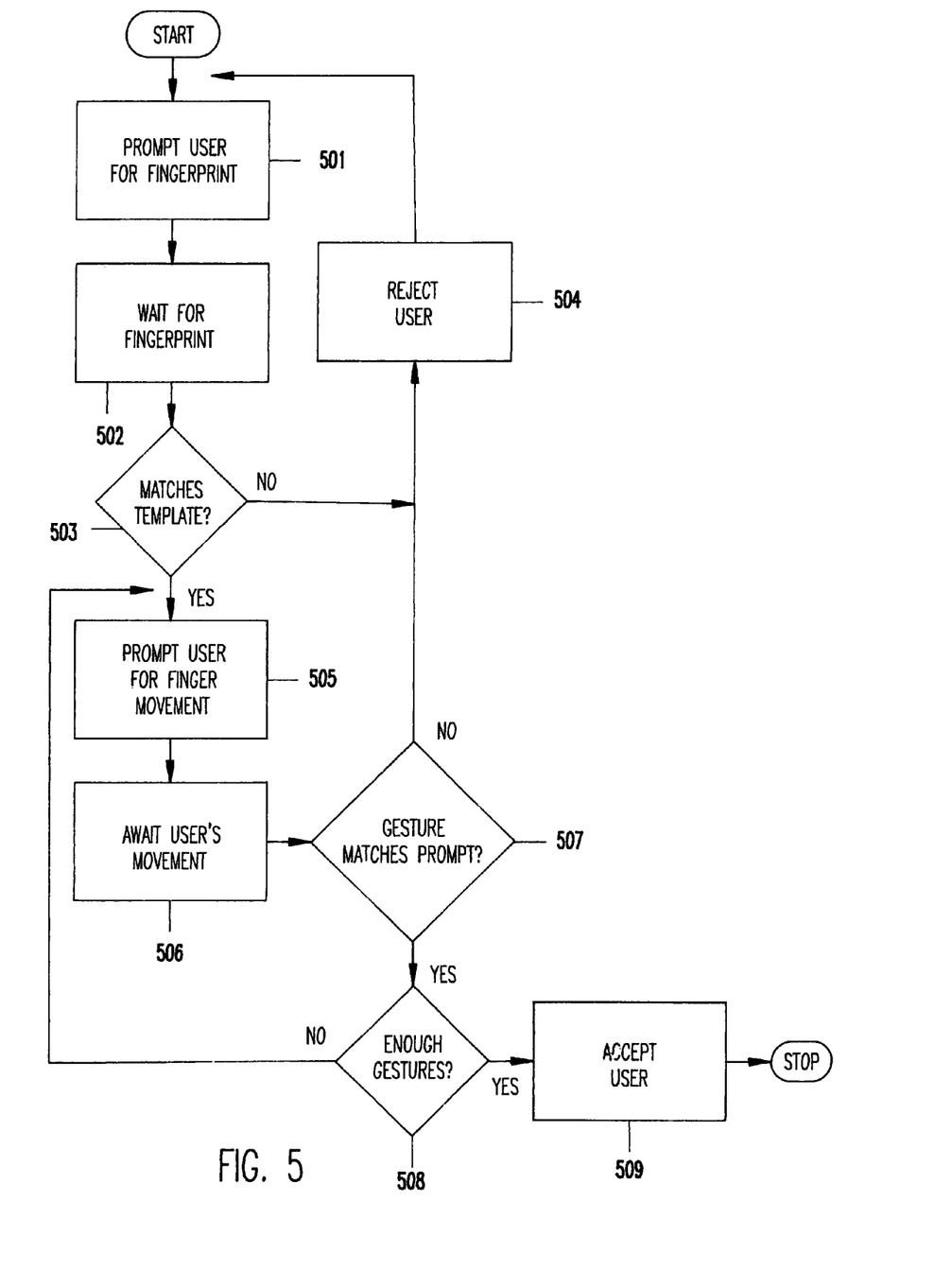
FIG. 5 is a flow diagram showing specific details of the authentication process.

The inventive system combats replay attacks with the steps shown in the flow chart of FIG. 5. FIG. 5 is a flow diagram for the operation of validating a user by prompting the user for a fingerprint 501, and by requiring the user to make finger movements (on the scanner or by reapplication of the finger to the scanner) to prevent replay attacks. As can be seen, the user is prompted for a fingerprint 501. After waiting for the fingerprint 502, the system determines if it matches the template 503. If the template is not matched then the user is rejected 504. If the template is matched, then the user is prompted for the finger movement 505. The movement can be chosen at random by the computer and the movement request will be unknown to the user until the time of request. After waiting for the user's movement 506, a determination is made as to whether the gesture matches the prompt 507. If not, the user is again rejected 504. Following step 507, a determination is made in step 508 as whether enough gestures were made. In some applications more than one gesture will be required. If enough gestures have not been made the system return to block 505 and prompt the user for another finger movement. Once enough gestures have been made the user is accepted as shown in block 509.

This system can also be used as a kind of password which protects the user from replay attacks, where a sophisticated computer program could mimic the gesture requested. In this case, the user chooses a sequence of simple gestures to be presented to the device, and the system asks for the sequence to be executed at verification time. The sequence is secret so cannot be simulated by an impostor, and can be changed in the event of an eavesdropper recording one such sequence, thus overcoming one of the limitations of biometrics—that they are unchangeable and cannot be revoked whenever some one else has a copy.

Figure 6:
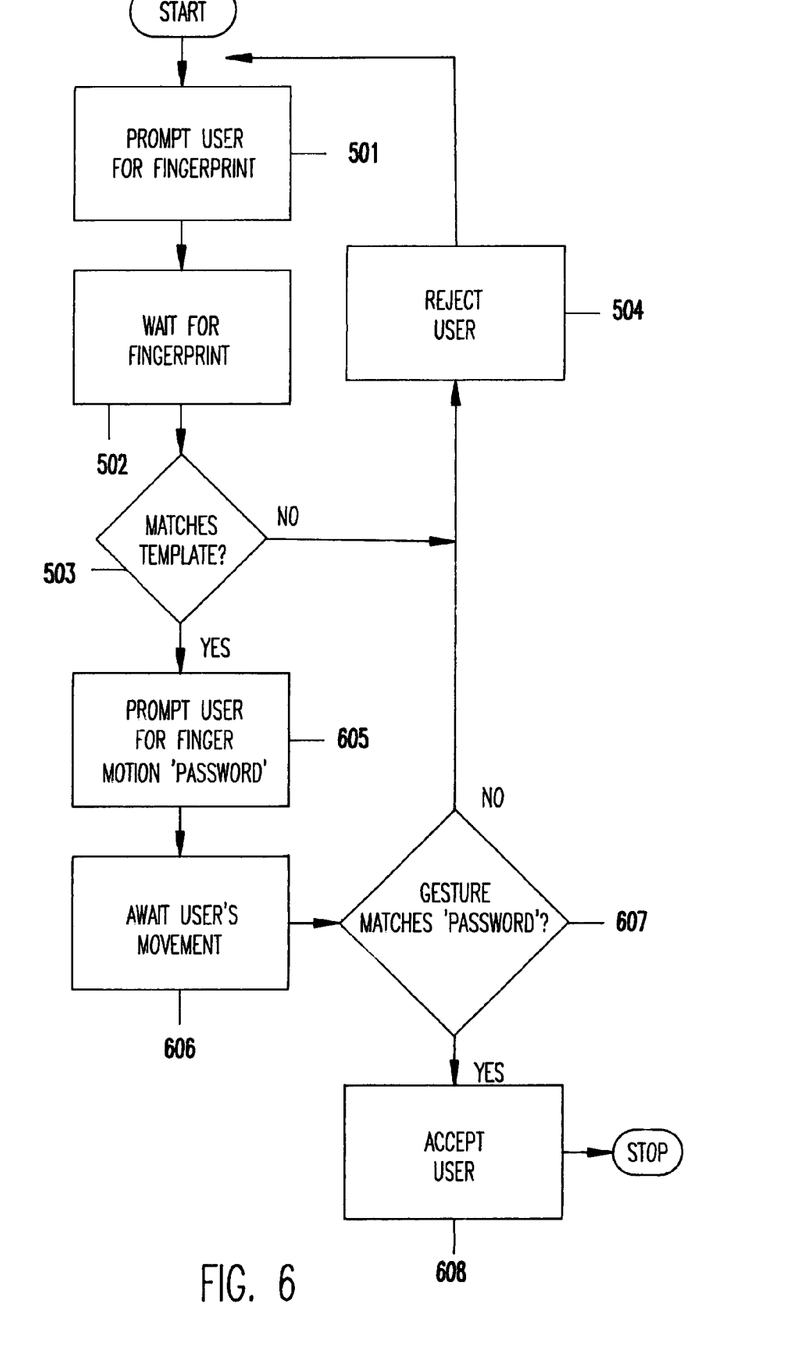
FIG. 6 is a flow diagram showing additional steps which may be added to the authentication process.

An alternative authentication process is shown in the flow chart of FIG. 6. As can be seen, this process includes the same steps shown in blocks 501 through 504 of FIG. 5. The diagram shows the operation of validating a user by prompting for a "gestural password" where in addition to presenting the finger to the scanner, the user must move the finger in a predefined, user-dependent, secret manner to prove that the user possesses the secret knowledge of this sequence. Once a matched template is found 503, the user is prompted for a finger motion "password" 605. The user has stored a motion previously. The user may change her finger motion password at anytime for increased security. Following the prompt for a password 605, the system awaits the user's movement 606, then makes a determination as to whether the movement matches the expected "password" 607. If a match is made the user is accepted 608, otherwise the user is rejected 504.

The inventive method has a number of uses for the information acquired from the sensor. The position information can be used as input to a gesture recognizer, or a character recognizer, whether handprint, cursive handwriting or a symbolic code like graffiti®. Without a specially constructed code, drawing such gestures on a standard fingerprint scanner would be difficult because of the size, but a number of sensors could be tiled together in a rectangular array to allow sensing over a wider area, making input of positional information for pointing or gesture input more easy.

An individual using the system might wish to tune parameters of the system to suit their own dexterity and preferences. In particular, parameters affecting the method and sensitivity for button click actions, and speed of cursor motion are customizable in the system. Since the system can identify the user with a fingerprint, after initial set-up, a user's customization settings can be selected automatically. An optional aspect of the invention is an initial calibration step for calibrating the pointing device. If the device is to be used as a pointing and authentication device, the user must be enrolled by a process in which the fingerprint and the "gestural password" are stored in the system.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for authenticating a user and for input of control information for an electronic device, said method comprising:
   acquiring through a scanner incorporated into a pointing device at least two fingerprint images of a finger;
   computing image correlations between a multiplicity of small regions of the acquired fingerprint images;
   extracting from each said fingerprint image at least one contact parameter, calculated by the step of computing image correlations, the contact parameter being determined between image attributes in each said fingerprint image; and
   using said fingerprint images and said at least one contact parameter to authenticate said user and to control said electronic device.

2. A method as in claim 1, wherein said contact parameter is rotation.

3. A method as in claim 1, wherein said contact parameter is translation.

4. A method as in claim 1, further comprising calculating pitch and roll rotations.

5. A method as in claim 1, further comprising the step of determining the rate of change of some control parameter where a rotation or translation of said finger relative to a reference position is used to determine the rate of change of some control parameter of the computer.

6. A method as in claim 5, wherein said the reference position is the position at which contact with the scanner is first registered, further comprising the step of resetting the reference point every time the finger reestablishes contact with the scanner.

7. A method as in claim 1, further comprising the step of comparing successive, and possibly consecutive, images taken from a single period of contact of said finger with said scanner.

8. A method as in claim 1 wherein at least one of said fingerprint images is a reference image captured previously.

9. A method as in claim 8 wherein the reference image is labeled with known rotation information.

10. A method as in claim 9, further comprising the step of prompting the user to present the finger at known rotations in an enrollment stage to provide said known rotation information.

11. A system for authenticating a user and for input of pointing information for a computer, said system comprising:
   a fingerprint image acquisition scanner incorporated into a pointing device for acquiring at least two fingerprint images of a finger, wherein said scanner is able to capture successive images of a finger in motion on a surface of said scanner;
   computing means for computing image correlations between the acquired fingerprint images;
   an image processor for extracting from said fingerprint image at least one contact parameter calculated by said computing means, other than any optional authentication status data for said fingerprint image;
   verifying an acquisition of data in real time from a live user based on one or more variations in each of said contact parameters; and
   means for using said successive fingerprint images and said at least one contact parameter to control a pointing device and to authenticate said user.

12. A system as in claim 11, said system further comprising means for directing a user to follow through on any combination of a multiplicity of prompts including: change a position of, add pressure to contact or rotate said finger from which a fingerprint image is acquired and wherein said multiplicity of prompts are verified by the system to ensure that the data is being generated at the time of direction.

13. A system as in claim 11, said system further comprising means for prompting the user to enact a sequence of finger actions previously registered by the user as a "password" for the device.

14. A system as in claim 13, where the "password" is a sequence of touching individual small fingerprint scanners in a specific order with the same finger.

15. A system as in claim 14, where the password is a sequence or touching individual small fingerprint scanners in a specific order, with more than one finger being used in the sequence either serially or in parallel.

16. A system as in claim 11 wherein a motion of the finger tip is interpreted as a gesture for recognition by a gesture engine.

17. The system of claim 11, further comprising:
- a feature extraction processor for extracting representative features from said fingerprint image;
- a memory for storing representative features of at least one authorized user; and
- a feature comparison processor for comparing said stored representative features with said extracted representative features, and generating authentication status data therefrom.

18. A system as in claim 17 wherein an identity of a user is used to set customized features of the computer.

19. A system as in claim 17 where the identity of said user is used to set customized parameters of the pointing device.

20. A system for imaging a fingerprint for input of control information for an electronic device, said system comprising:
- a fingerprint image acquisition scanner incorporated into a pointing device for acquiring at least two fingerprint images of a finger, wherein said scanner is able to capture successive images of a finger in motion on a surface of said scanner;
- computing means for computing image correlations between the acquired fingerprint images; and
- an image processor for extracting from said finger print image at least one contact parameter, representing the angle of the finger in relation to the scanner, where said angle is calculated by said computing means as correlations between image attributes of two or more images acquired from fingerprint image acquisition scanner;
- wherein said successive fingerprint images and said at least one contact parameter are used for control of said electronic device and for authentication of a user.

21. A system for authenticating a user and for input of pointing information for a computer, said system comprising:
- a multiplicity of fingerprint image acquisition scanners incorporated into a pointing device providing a large input surface for acquiring successive fingerprint images of a finger;
- computing means for computing image correlations between the successively acquired fingerprint images; and
- an image processor for extracting from each said fingerprint image at least one contact parameter calculated by said computing means, other than any optional authentication status data for said fingerprint image; and
- means for using said fingerprint images and said at least one contact parameter to authenticate said user and as input of pointing information for a computer.

22. A system as in claim 21, where the scanner consists of a one-dimensional array of small fingerprint scanners.

23. A system as in claim 21, where the scanner consists of a two-dimensional array of small fingerprint scanners.

* * * * *